United States Patent
Shin et al.

(10) Patent No.: US 10,179,575 B2
(45) Date of Patent: Jan. 15, 2019

(54) ELECTRONIC BRAKE SYSTEM USING INTEGRATED SENSOR AND METHOD OF OPERATING THE SAME

(71) Applicant: LUCAS AUTOMOTIVE GMBH, Koblenz (DE)

(72) Inventors: Sung Hwan Shin, Seoul (KR); Min Seok Kwon, Bucheon-si (KR)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 15/073,468

(22) Filed: Mar. 17, 2016

(65) Prior Publication Data

US 2016/0272173 A1 Sep. 22, 2016

(30) Foreign Application Priority Data

Mar. 18, 2015 (KR) .......................... 10-2015-0037597

(51) Int. Cl.
  *B60T 8/17* (2006.01)
  *B60T 7/04* (2006.01)
  (Continued)

(52) U.S. Cl.
  CPC ................ *B60T 8/17* (2013.01); *B60T 7/042* (2013.01); *B60T 8/171* (2013.01); *B60T 8/172* (2013.01);
  (Continued)

(58) Field of Classification Search
  CPC . B60T 8/17; B60T 8/171; B60T 8/172; B60T 8/368; B60T 7/042; B60T 13/74;
  (Continued)

(56) References Cited

U.S. PATENT DOCUMENTS

| | | | | |
|---|---|---|---|---|
| 4,588,933 A | * | 5/1986 | Sun ........................... | H02P 6/34 |
| | | | | 318/400.21 |
| 6,164,183 A | * | 12/2000 | Fulks .................... | B60T 8/4854 |
| | | | | 91/367 |

(Continued)

FOREIGN PATENT DOCUMENTS

| DE | 102012205859 | 10/2012 |
|---|---|---|
| DE | 102012213216 | 2/2013 |

(Continued)

OTHER PUBLICATIONS

European Search Report dated Dec. 2, 2016 for European Patent Application No. 16160186.9 (7 pages).

*Primary Examiner* — Behrang Badii
(74) *Attorney, Agent, or Firm* — MacMillan, Sobanski & Todd, LLC

(57) ABSTRACT

Disclosed herein is an electronic brake system using an integrated sensor, which includes a hydraulic block configured to distribute and supply a fluid to a wheel brake, and having a through-hole penetrated at both sides thereof, a sensor module installed at one side of the hydraulic block having the through-hole, for sensing a linear displacement of a brake pedal and a position of a motor, and an electronic control unit installed to a side of the hydraulic block opposite to the sensor module, in order to determine a movement distance of the pedal, based on the linear displacement of the pedal sensed by the sensor module, and control rotation of the motor depending on the linear displacement of the pedal.

14 Claims, 6 Drawing Sheets

(51) Int. Cl.
*G05G 1/30* (2008.04)
*B60T 8/171* (2006.01)
*B60T 8/172* (2006.01)
*B60T 13/66* (2006.01)
*B60T 8/36* (2006.01)
*B60T 8/40* (2006.01)
*B60T 13/74* (2006.01)
*G01D 5/14* (2006.01)
*G01D 5/20* (2006.01)

(52) U.S. Cl.
CPC ............ *B60T 8/368* (2013.01); *B60T 13/66* (2013.01); *G05G 1/30* (2013.01); *B60T 8/4077* (2013.01); *B60T 8/4081* (2013.01); *B60T 13/74* (2013.01); *B60T 2220/04* (2013.01); *G01D 5/14* (2013.01); *G01D 5/20* (2013.01)

(58) Field of Classification Search
CPC .......... B60T 8/4081; B60T 1/00; B60T 8/409; B60T 13/662; B60T 13/745; B60T 13/167; B60T 1/06; B60T 8/36; B60T 8/32; B60T 8/42; B60T 13/66; B60T 8/4077; G05G 1/30; F16D 65/097; F16D 65/12; F16D 65/14; F16D 65/092; F16D 55/24; F16D 55/40; F16D 55/36; F16D 55/32; G01D 11/245; G01D 21/02; G01D 5/14

See application file for complete search history.

(56) References Cited

U.S. PATENT DOCUMENTS

| | | | | |
|---|---|---|---|---|
| 6,244,391 | B1* | 6/2001 | Bunker | B60T 1/065 188/141 |
| 6,347,518 | B1* | 2/2002 | Kingston | B60T 7/042 60/552 |
| 6,591,710 | B1* | 7/2003 | Shaw | G05G 1/30 123/399 |
| 2001/0056544 | A1* | 12/2001 | Walker | B60R 25/02 726/2 |
| 2002/0117893 | A1* | 8/2002 | Shaw | B60T 8/3255 303/113.4 |
| 2002/0130790 | A1* | 9/2002 | Sherringham | B60K 23/02 340/870.36 |
| 2003/0024245 | A1* | 2/2003 | Fulks | B60T 13/745 60/545 |
| 2008/0288147 | A1* | 11/2008 | Cesario | B60T 8/174 701/70 |
| 2009/0179485 | A1* | 7/2009 | Yang | B60T 7/042 303/20 |
| 2011/0084635 | A1* | 4/2011 | Brown | H02P 6/182 318/400.13 |
| 2011/0254362 | A1* | 10/2011 | Maury | B60T 13/745 303/20 |
| 2013/0232966 | A1* | 9/2013 | Murayama | B60T 7/042 60/545 |
| 2014/0100080 | A1* | 4/2014 | Ruona | B60T 10/02 477/72 |
| 2014/0110997 | A1 | 4/2014 | Biller et al. | |
| 2014/0216866 | A1 | 8/2014 | Feigel et al. | |
| 2014/0306513 | A1* | 10/2014 | Cunningham | B60T 8/17 303/4 |
| 2015/0070003 | A1* | 3/2015 | Elliott | B60T 8/368 324/207.15 |
| 2016/0009263 | A1 | 1/2016 | Feigel et al. | |

FOREIGN PATENT DOCUMENTS

| | | |
|---|---|---|
| DE | 102013224870 | 9/2014 |
| DE | 102013217745 | 3/2015 |
| KR | 10-2013-0130767 A | 12/2013 |

\* cited by examiner

ELECTRONIC BRAKE SYSTEM USING INTEGRATED SENSOR AND METHOD OF OPERATING THE SAME

CROSS-REFERENCE TO RELATED APPLICATIONS

This application claims priority to Korean Patent Application No. 10-2015-0037597, filed on Mar. 18, 2015, the disclosure of which is incorporated herein by reference in its entirety.

BACKGROUND

The technology disclosed in this patent document relates to automobile brakes.

Brake boosters can be used to increase braking efficiency and improve response speed during braking in automobiles, such as hybrid and electric vehicles. Some existing electronic brake systems having brake boosters are mounted in vehicles serve to increase braking efficiency and improve response speed during braking described above. In addition, the electronic brake systems may reduce costs by integrating elements related to braking functions. Electronic brake systems can embody various desired functions related to vehicle safety.

SUMMARY

Exemplary embodiments of the disclosed technology relate to a non-contact integrated sensor module applied to a vehicle electronic brake system, and more particularly, to a structure in which a single housing is provided with a pedal displacement sensor and a rotor position sensor for controlling an electric motor according to a variation in pedal displacement.

The disclosed technology can be used or implemented in one or more ways to provide a sensor unit in which a pedal displacement sensor integrates with a motor rotor displacement sensor, and more particularly, to provide a stable electronic brake system in which a non-contact linear position sensor and a non-contact rotational position sensor are mounted as a single integrated sensor module.

In accordance with one aspect of the disclosed technology, an electronic brake system using an integrated sensor includes a hydraulic block configured to distribute and supply a fluid to a wheel brake, and having a through-hole penetrated at both sides thereof, a sensor module installed at one side of the hydraulic block having the through-hole, for sensing a linear displacement of a brake pedal and a position of a motor, and an electronic control unit installed to a side of the hydraulic block opposite to the sensor module, in order to determine a movement distance of the pedal, based on the linear displacement of the pedal sensed by the sensor module, and control rotation of the motor depending on the linear displacement of the pedal.

The sensor module may include a sensor housing coupled to the through-hole of the hydraulic block, and having a through-hole penetrated at both sides thereof, a circuit board installed at one side of the sensor housing and having a through-hole penetrated at both sides thereof, a sensing-related electric part being mounted on the circuit board, a pedal sensor module mounted at one side of the circuit board, in order to sense a magnetic field variation depending on movement of the pedal, and transfer information about the sensed magnetic field variation to the electronic control unit, and a motor sensor module mounted at one side of the circuit board, in order to sense an induced current generated by rotation of a rotor, and transfer information about the sensed induced current to the electronic control unit.

The electronic brake system may further include a connection unit electrically connecting the sensor module to the electronic control unit through the through-hole of the hydraulic block while one end of the connection unit is fixed to the sensor module.

The pedal sensor module may include an input rod connected to the connection unit so as to be moved depending on movement of the pedal, a magnet provided at one end of the input rod so as to be moved depending on movement of the input rod, and a sensor unit configured to sense a magnetic field variation depending on movement of a magnetic substance, and transfer the sensed magnetic field variation to the electronic control unit.

The sensor unit may be installed at one side of the circuit board, and the magnet may be disposed above the sensor unit so as to be spaced apart from the sensor unit.

The sensor unit may be one of a Hall device, a reed switch, an AMR (Anisotropic Magneto-Resistive) sensor, and a GMR (Giant Magneto-Resistive) sensor.

The sensor unit may respond to a magnetic field having a directional component in an x-z plane or a y-z plane perpendicular to the circuit board to sense a variation of the magnetic field, and the electronic control unit may generate an x-z angle signal or a y-z angle signal indicative of an angle of the directional component of the magnetic field from information about the variation of the magnetic field.

The motor sensor module may include a coil in which an induced current is generated by movement of the motor rotor, and a current sensor configured to sense the induced current in the coil and transfer a value of the sensed induced current to the electronic control unit.

The coil may include a first coil in which a magnetic flux is formed by electric energy generated by rotation of the motor, and a second coil configured of a pair of coils connected to each other while an induced current is generated according to the magnetic flux in the first coil.

The electronic control unit may determine an rpm of the motor, based on a rotation angle displacement of the motor.

In accordance with another aspect of the disclosed technology, a method of operating an electronic brake system, including a circuit board configured such that a pedal sensor module for sensing a linear displacement of a pedal is mounted on one side of the circuit board and a motor sensor module for sensing a rotation angle displacement of a motor is mounted on the circuit board, using an integrated sensor, includes sensing a variation of a magnetic field generated by a magnet moved along with movement of an input rod, determining a movement distance of the pedal, based on an intensity and a direction of the magnetic field, sensing a position of the motor, and controlling rotation of the motor corresponding to the movement distance of the pedal.

The method may further include determining a rotation displacement of the motor, based on the rotation of the motor.

The method may further include responding to a magnetic field having a directional component in an x-z plane or a y-z plane perpendicular to the circuit board to sense a variation of the magnetic field, and generating an x-z angle signal or a y-z angle signal indicative of an angle of the directional component of the magnetic field from information about the variation of the magnetic field.

It is to be understood that both the foregoing and the following detailed descriptions are exemplary and explanatory.

BRIEF DESCRIPTION OF THE DRAWINGS

Various features and advantages of the disclosed technology are further disclosed in the following detailed description taken in conjunction with the accompanying drawings, in which.

DESCRIPTION OF SPECIFIC EMBODIMENTS

Figure 1:
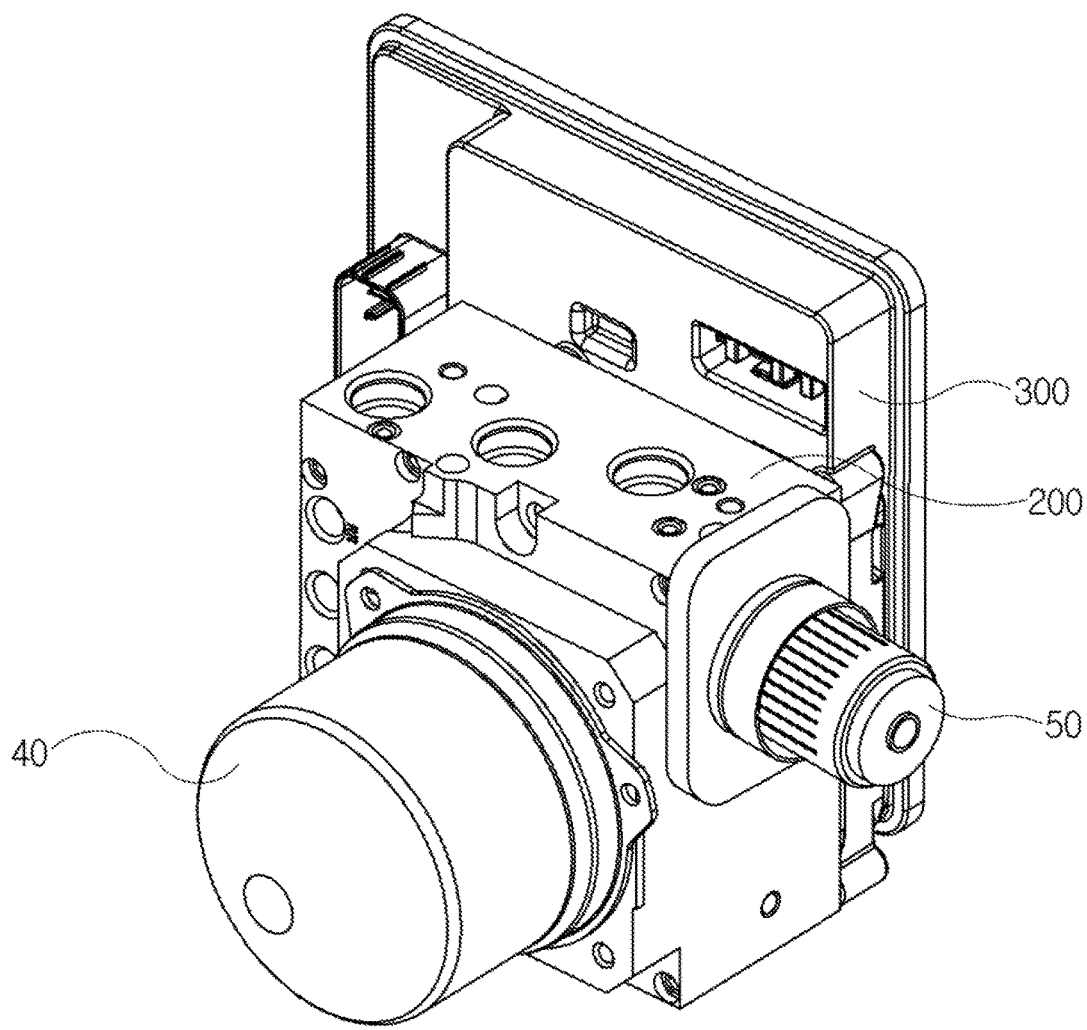
FIG. 1 is a view illustrating an electronic brake system according to an embodiment of the disclosed technology.

In general, electronic brake systems are aimed at obtaining strong and stable braking force by efficiently preventing vehicles from slipping. For the electronic brake systems, there are designs based on an Anti-Lock Brake System (ABS) which prevents wheels from slipping when a vehicle is braked, a brake traction control system which prevents drive wheels from slipping when a vehicle speeds up or suddenly accelerates, and a vehicle attitude control system which stably maintains traveling of a vehicle by controlling brake oil pressure through the combination of an ABS and a brake traction control system.

Such an electronic brake system includes a plurality of solenoid valves for adjusting braking hydraulic pressure transferred to a wheel brake, a hydraulic block mounted with low-pressure and high-pressure accumulators, and an electronic control unit for controlling the driving of the solenoid valves and motor.

In various conventional electronic brake systems, an electronic brake system can be individually provided with a pedal displacement sensor and a motor rotor displacement sensor, and leads for transmission of electric signals indicative of displacements have long lengths due to these two individual sensors. Due to those features, the whole response speed of the brake system may be lowered.

In addition, the structures of the pedal displacement sensor and the motor rotor displacement sensor may produce a undesired influence on the surrounding environment of the brake system, and may increase the constituent components of the brake system. Accordingly, an assembly time may be increased, system safety may be lowered, and costs may be increased.

Exemplary embodiments of the disclosed technology are described below in more detail with reference to the accompanying drawings. Throughout the disclosure, like reference numerals refer to like parts throughout the various figures and embodiments. In certain embodiments, detailed descriptions of device constructions or processes well known in the art may be omitted to avoid obscuring appreciation of the disclosure by a person of ordinary skill in the art.

The disclosed technology may be embodied in different forms and specific examples disclosed in this document should not be construed as limitations to implementations of the disclosed technology.

In the context of this document, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As illustrated in FIGS. 1 to 5, the electronic brake system according to the embodiment of the disclosed technology is an electronic brake system using an integrated sensor, which has a separate fluid supply unit for supplying a fluid. The electronic brake system may include a hydraulic block 200 which is configured to distribute and supply a fluid to a wheel brake, and has a through-hole 201 penetrated at both sides thereof, a sensor module 130, which is installed at one side of the hydraulic block 200 having the through-hole 201, and senses a linear displacement of a brake pedal and a position of a motor, and an ECU (Electronic Control Unit) 300 which is installed to the side of the hydraulic block 200 opposite to the sensor module 130, determines a movement distance of the pedal, based on the linear displacement of the pedal sensed by the sensor module 130, and controls rotation of the motor depending on the linear displacement of the pedal.

Figure 3:
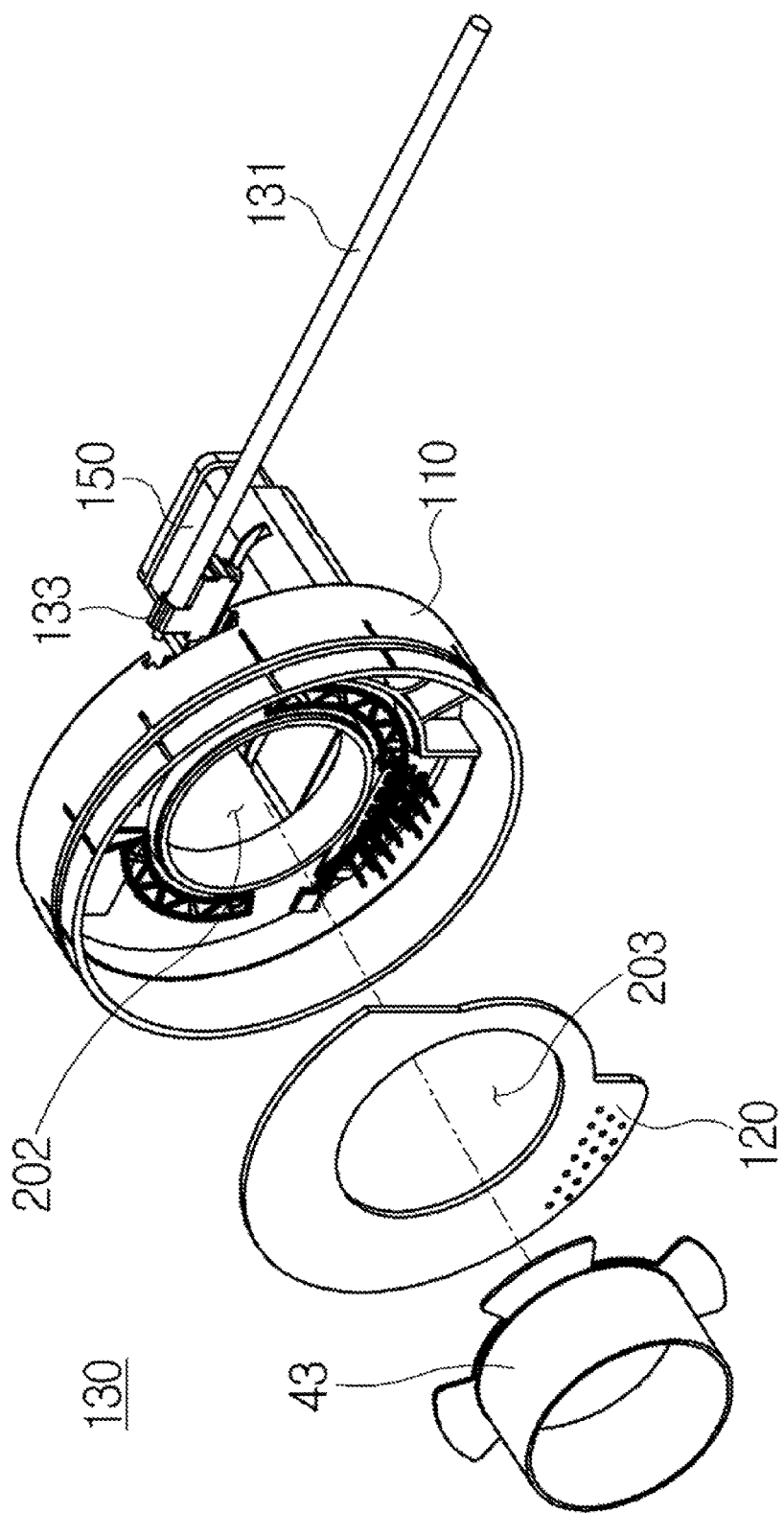
FIG. 3 is an exploded perspective illustrating a sensor module according to the embodiment of the disclosed technology.

FIG. 3 is an exploded perspective illustrating the configuration of the sensor module 130 according to the embodiment of disclosed technology.

The sensor module 130 may include a sensor housing 110 which is coupled to the through-hole 201 of the hydraulic block 200, and has a through-hole 202 penetrated at both sides thereof, a circuit board 120 which is installed at one side of the sensor housing 110, has a through-hole 203 penetrated at both sides thereof, and is mounted with a sensing-related electric part, a pedal sensor module which is mounted at one side of the circuit board 120, senses a magnetic field variation depending on movement of the pedal, and transfers information about the sensed magnetic field variation to the ECU 300, and a motor sensor module which is mounted at one side of the circuit board 120, senses an induced current generated by rotation of a rotor, and transfers information about the sensed induced current to the ECU 300.

In addition, the electronic brake system may further include a connection unit which electrically connects the sensor module 130 to the ECU 300 through the through-hole 201 of the hydraulic block 200 while one end of the connection unit is fixed to the sensor module 130.

The pedal sensor module may include an input rod 131 which is connected to the connection unit, and is moved depending on movement of the pedal, a magnet 133 which is provided at one end of the input rod 131, and is moved depending on movement of the input rod 131, and a sensor unit 135 which senses a magnetic field variation depending on movement of a magnetic substance, and transfers the sensed magnetic field variation to the ECU 300.

In this case, the sensor unit 135 may be installed at one side of the circuit board 120, and the magnet 133 may be disposed above the sensor unit 135 so as to be spaced apart from the sensor unit 135.

Here, the sensor unit 135 may be any one of a Hall device, a reed switch, an AMR (Anisotropic Magneto-Resistive) sensor, and a GMR (Giant Magneto-Resistive) sensor.

In addition, the sensor unit 135 responds to a magnetic field having a directional component in the x-z plane or y-z plane perpendicular to the circuit board 120 to sense a variation of the magnetic field, and the ECU 300 may generate an x-z angle signal or a y-z angle signal indicative of the angle of the directional component of the magnetic field from information about the variation of the magnetic field.

The motor sensor module may include a coil in which an induced current is generated by movement of a motor rotor 43, and a current sensor which senses the induced current in the coil and transfers a value of the sensed induced current to the ECU 300.

The coil may include a first coil in which a magnetic flux is formed by electric energy generated by rotation of the motor, and a second coil configured of a pair of coils connected to each other while an induced current is generated according to the magnetic flux in the first coil.

The ECU 300 may determine an rpm of the motor, based on the rotation angle displacement of the motor.

Hereinafter, the operation of the electronic brake system using an integrated sensor according to the embodiment of the disclosed technology will be described.

The hydraulic block 200 may be provided with a passage constituting a hydraulic circuit which is connected to a master cylinder to adjust the pressure of brake oil transferred to wheel brakes installed at front and rear wheels, so that the introduced brake oil is discharged to the wheel brakes through the hydraulic circuit.

The ECU 300 is a unit which controls an electronic brake, based on sensing values required to control the brake, and is coupled to one surface of the hydraulic block 200 by a fastening member.

The ECU 300 includes a separate housing, and the housing may be installed to the hydraulic block 200 by a fastening member.

The ECU 300 may refer to an electronic control device which controls the states of a vehicle engine, an automatic transmission, an ABS, etc. using a computer, and may generally control the electronic brake system of the disclosed technology.

The sensor module 130 is coupled to the side of the hydraulic block 200 opposite to the ECU 300, and may be connected to the ECU 300 by a separate connection unit to be described below.

The sensor module 130 according to the embodiment of the disclosed technology may sense the position of the motor, and simultaneously sense the linear displacement of the pedal. That is, by integrating two sensors, which sense positions of different parts, as a single module, it is possible to improve the safety of the electronic brake system, simplify the structure of the electronic brake system, and reduce costs. In addition, since a space required to mount sensors is reduced, it is possible to increase the utilization of space.

The sensor module 130 may include a motor sensor module which senses the position of the motor, and a pedal sensor module which senses a magnetic field variation depending on movement of the pedal. That is, the sensor module 130 may include a structure in which two individual non-contact sensors are mounted on one circuit board 120.

That is, the main constituent components of the module are included in a single structure.

The pedal sensor module is to sense the displacement of the brake pedal. The pedal sensor module may sense a variation and intensity of magnetic field depending on the input rod 131 moved when a driver presses the brake pedal.

Figure 5:
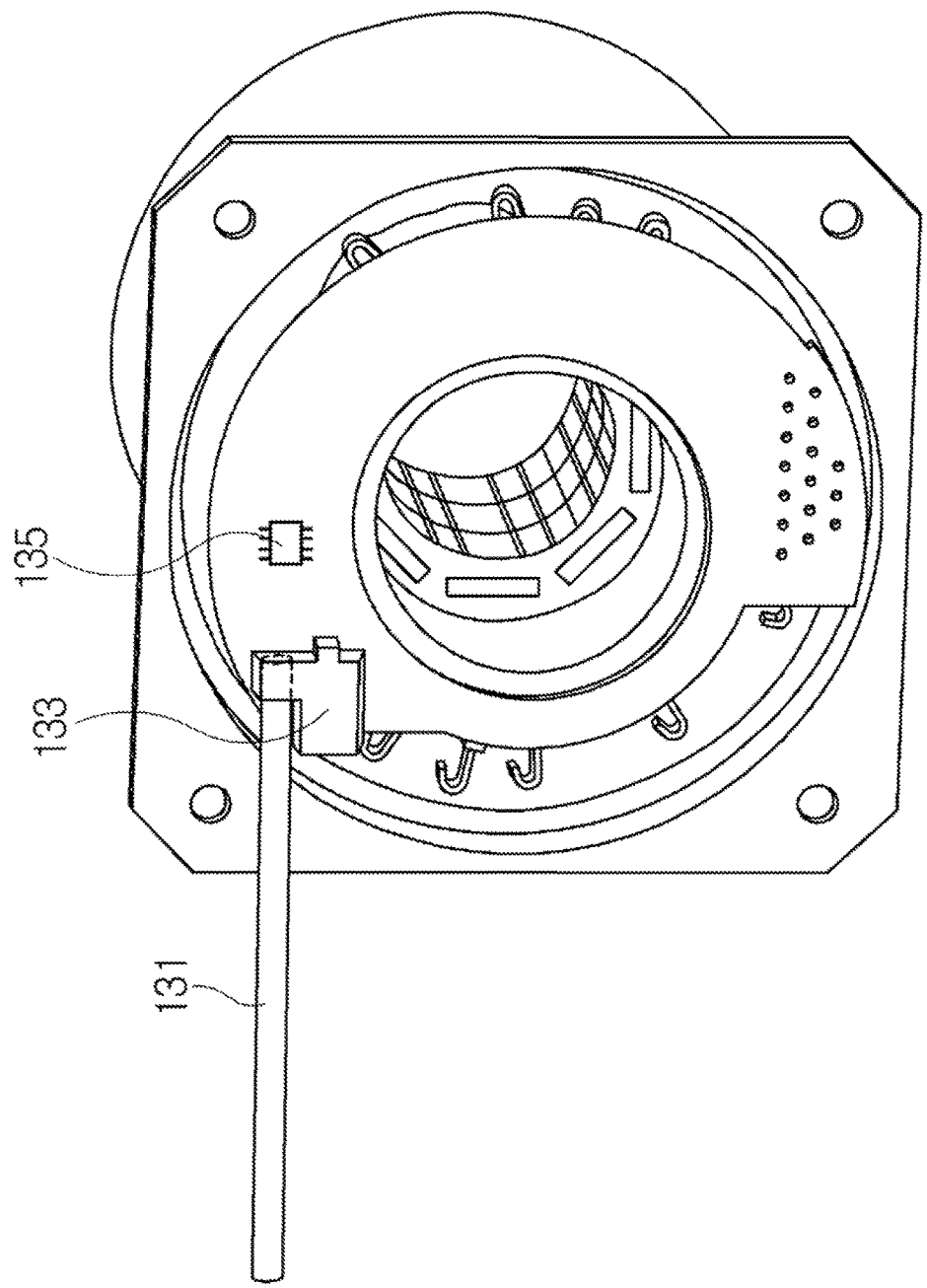
FIG. 5 is a rear view illustrating the coupled structure of the sensor module in the electronic brake system of FIG. 1.

Referring to FIG. 5, the circuit board 120 mounted with the pedal sensor module may be seen.

In more detail, the magnet 133 connected to one end of the input rod 131 is moved along with the movement of the input rod 131 connected to the pedal. A magnetic field is generated by the movement of the magnet 133, and the sensor unit 135 may sense a variation of the magnetic field.

In addition, values indicative of the direction and intensity of the magnetic field sensed by the sensor unit are transferred to the ECU 300, and the ECU 300 may determine a displacement of the input rod 131, i.e. a level of the pedal pressed by the driver, based on the values.

Here, the sensor unit 135 may use a Hall sensor or an induced current sensor, or use any one of a reed switch, an AMR sensor, and a GMR sensor.

The sensor unit 135 may respond to a magnetic field, which is generated by movement of the magnet 133 and has a directional component in the x-z plane or y-z plane, to sense a variation of the magnetic field. The directional component may be output as a linear value deduced by converting a sine or cosine value into an arctangent value. The output linear value may be transferred to the ECU 300.

The sensor unit 135 may include a plurality of magnetic sensors. In this case, the sensor unit 135 may be set to receive a representative signal of signals output from the magnetic sensors. In addition, the sensor unit 135 may include an angle detection circuit configured to generate an x-z angle signal indicative of the directional component of the magnetic field in the x-z plane, and an angle detection circuit configured to generate a y-z angle signal indicative of the directional component of the magnetic field in the y-z plane.

In some examples of the sensor unit 135, a plurality of magnetic sensor elements may include a plurality of vertical Hall elements arranged in the form of circular vertical Hall.

In some examples of the sensor unit 135, the vertical Hall elements and the angle detection circuits may be connected to a single circuit board 120.

In some examples of the magnetic sensor, a plurality of magnetic sensor elements may include a plurality of magnetoresistances.

The motor sensor module is to sense the position of the motor, and may sense the absolute position of the motor such that the motor may be driven according to the variation of the pedal. That is, the motor sensor module may sense the position of the motor such that electric power may be applied to the motor for actuation thereof.

The motor sensor module may integrally detect the position of the motor through a variation in magnetic field caused by the magnet for detecting the variation of the pedal, without using a separate magnet for detecting the position of the motor.

In addition, the motor sensor module may use a first coil and two second coils in order to convert a displacement into an electric signal using the mutual induction action of coils by an LVDT (Linear Variable Differential Transform).

The LVDT refers to an electric converter which measures a different in linear distance, and has a structure in which three solenoid coils are located around a tube. Among the three solenoid coils, the main coil is located at the center, and the remaining two coils are located around the main coil. The LVDT informs of a position value of an object to be measured by moving a cylindrical magnet core along the center of the tube.

Figure 4:
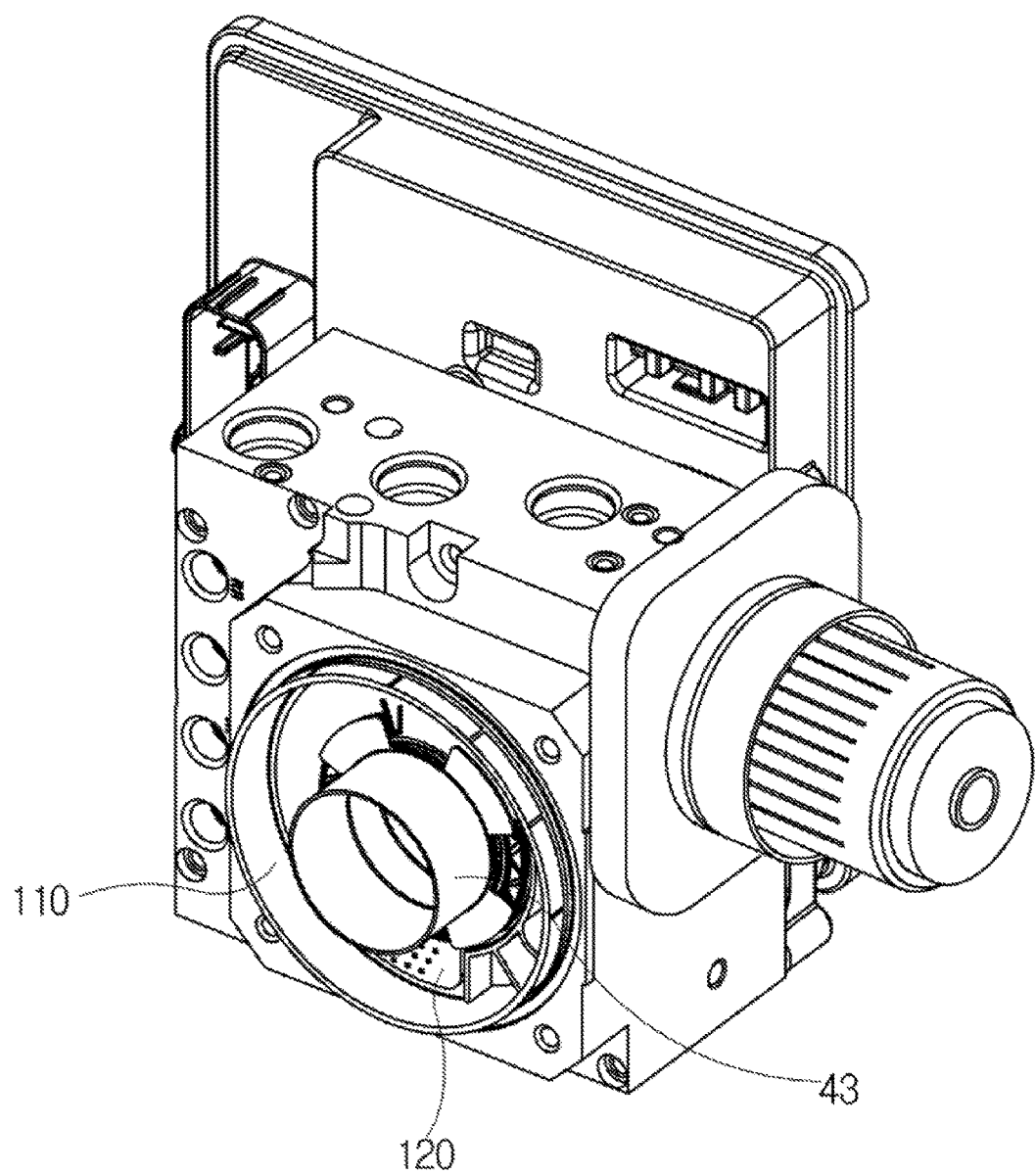
FIG. 4 is a front view illustrating the coupled structure of the sensor module in the electronic brake system of FIG. 1.

Referring to FIG. 4, the front portion of the brake system mounted with the sensor module 130 according to the disclosed technology may be seen. In FIG. 4, the motor rotor 43 connected to the motor, the coil in which an induced current is generated by the rotation of the motor rotor 43, and the circuit board 120 connected to the coil may be seen.

The circuit board 120 has a coil pattern, and thus an induced current may be generated by the rotation of the rotor which is rotated along with the rotation of the motor. The method of detecting the rotation of the motor through the induced current may use the LVDT.

The LVDT, which converts a mechanical displacement into an electric signal, is a transducer which changes a variation of magnetic flux induced in a primary coil and a secondary coil according to movement of a core or an armature, i.e. changes a mutual inductance. Here, the mechanical displacement may be output as an electric signal in proportion to the displacement of the core which is movable in the mechanically or electrically separated state. The LVDT may include a former around which a coil is wound, a core, a support rod for supporting the core, and a case.

The induced current measured through the coil is transferred to the ECU 300, and the ECU 300 may detect information related to an absolute position of the motor, an amount of rotation thereof, and a rotation direction thereof, based on the measured induced current.

Figure 2:
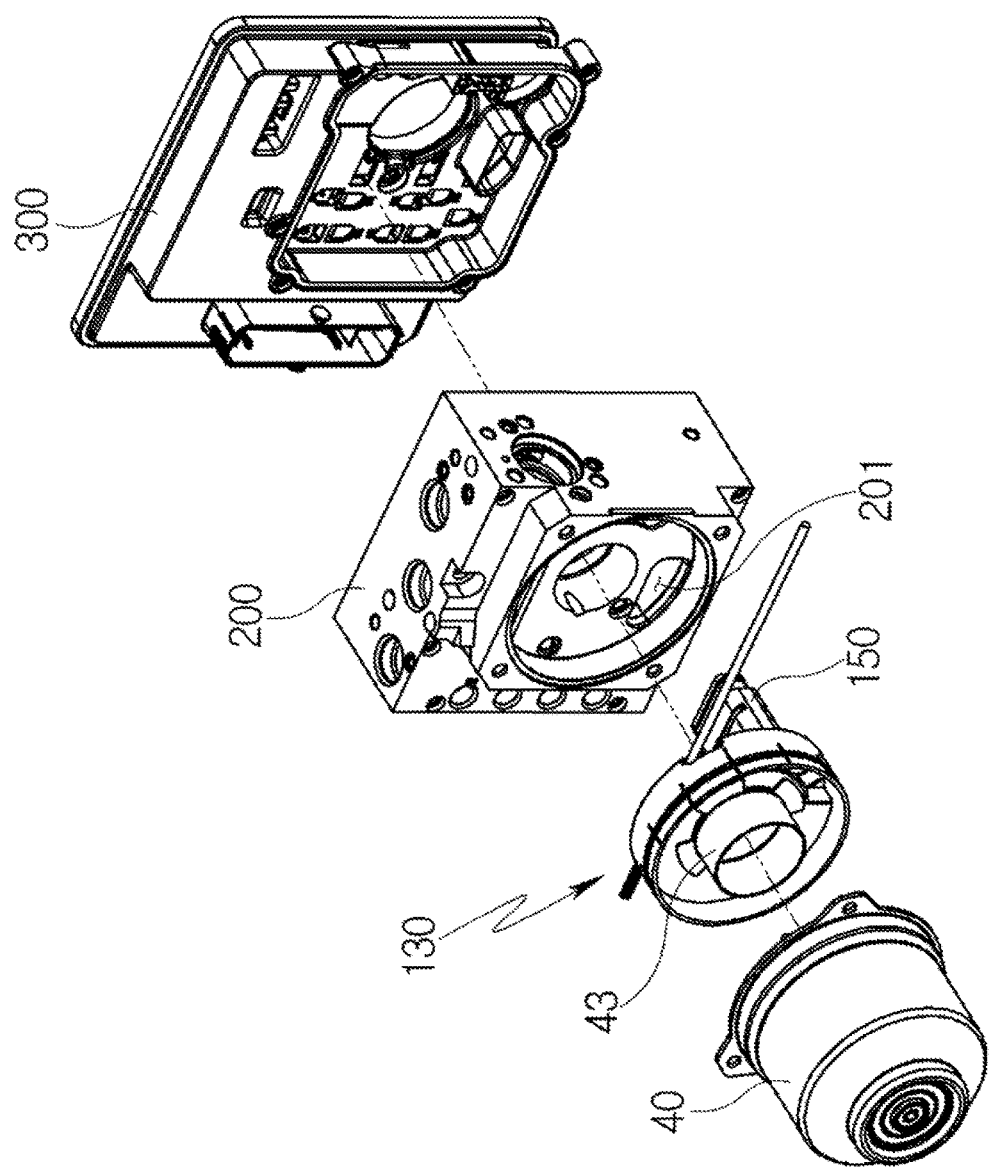
FIG. 2 is a perspective view illustrating the electronic brake system of FIG. 1.

Referring to FIG. 2, the connection unit, which electrically connects the sensor module 130 to the ECU 300, may be penetrated and coupled to the hydraulic block 200 before the sensor module 130 is connected to the ECU 300.

Accordingly, when the connection unit is decoupled from the sensor module 130, the connection unit may be connected to the sensor module 130. The sensor module 130 may be prepared in the state in which one end of the connection unit is connected to the circuit board 120 of the sensor module 130.

Thereinafter, the sensor module 130 is coupled to one side of the hydraulic block 200 while the connection unit connected to the sensor module 130 is fitted into the through-hole 210 of the hydraulic block 200.

As such, when the sensor module 130 is coupled to one side of the hydraulic block 200, the ECU 300 may be coupled to the other side of the hydraulic block 200 opposite to the sensor module 130, together with the housing. In this case, the connection unit may be electrically connected to a terminal provided in the ECU 300.

FIGS. 4 and 5 illustrate the state in which the sensor module is coupled through the connection unit when viewed from the front and the rear.

When the sensor module 130 is connected to the ECU 300, the connection unit is penetrated and connected to the hydraulic block 200. Thus, since the connection unit is not exposed to the outside of the hydraulic block 200, the connection unit can be conveniently arranged without interfering with peripheral parts.

Figure 6:
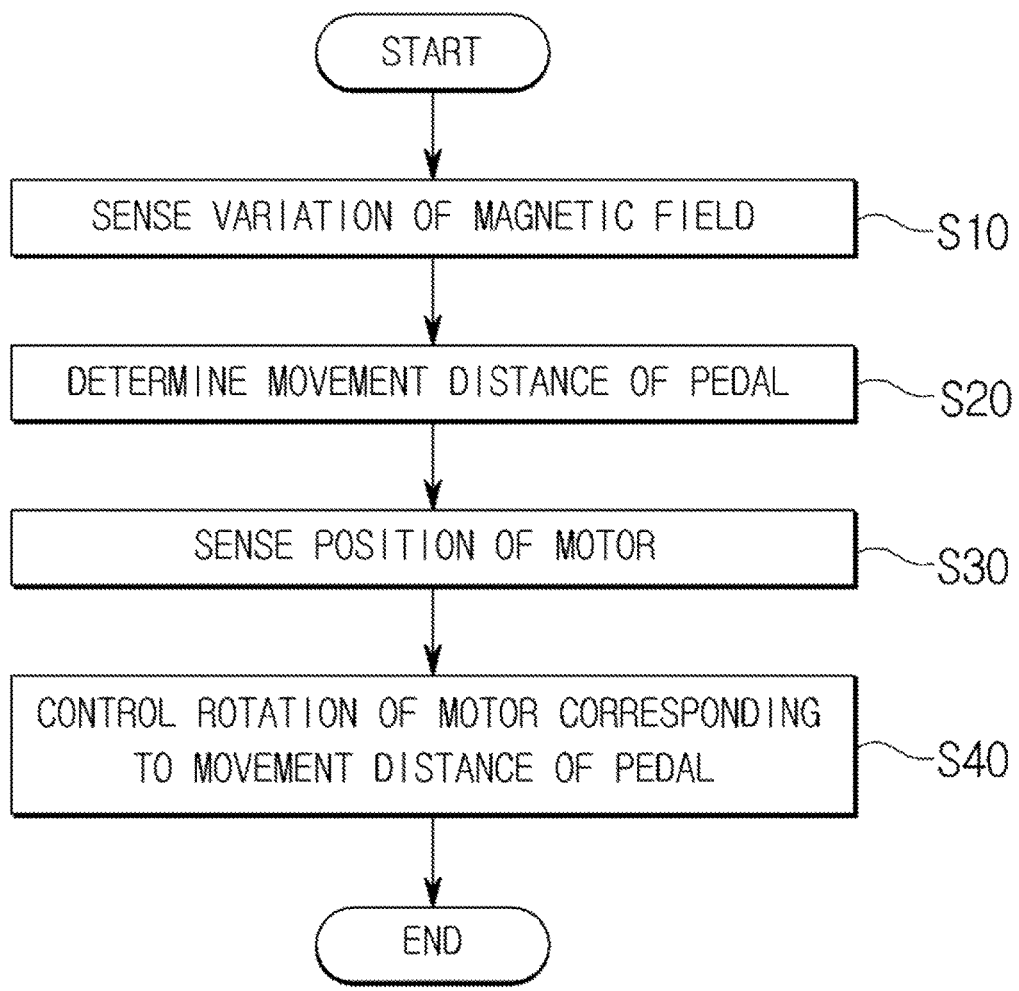
FIG. 6 is a flowchart illustrating a method of operating an electronic brake system according to an embodiment of the disclosed technology.

FIG. 6 is a flowchart illustrating a method of operating an electronic brake system according to an embodiment of the disclosed technology.

As illustrated in FIG. 6, the embodiment of the disclosed technology may provide a method of operating an electronic brake system using an integrated sensor. The method of operating an electronic brake system which includes a circuit board 120 configured such that a pedal sensor module for sensing a linear displacement of a pedal is mounted on one side of the circuit board and a motor sensor module for sensing a rotation angle displacement of a motor is mounted on the circuit board, may include a step (S10) of sensing a variation of a magnetic field generated by a magnet 133 moved along with movement of an input rod 131, a step (S20) of determining a movement distance of the pedal, based on the intensity and direction of the magnetic field, a step (S30) of sensing a position of the motor, and a step (S40) of controlling rotation of the motor corresponding to the movement distance of the pedal.

Accordingly, the disclosed technology may be used to provide a method capable of improving the safety of the system by mounting respective sensors, which sense the displacement of the pedal and the position of the motor, as a single module.

Through such a method, it is possible to measure the rotation of the motor without a separate magnet for detecting the displacement of the motor.

In addition, the method may further include a step of determining a rotation displacement of the motor, based on the rotation of the motor.

Furthermore, the method may further include a step of responding to a magnetic field having a directional component in the x-z plane or y-z plane perpendicular to the circuit board 120 to sense a variation of the magnetic field, and a step of generating an x-z angle signal or a y-z angle signal indicative of the angle of the directional component of the magnetic field from information about the variation of the magnetic field.

Since the pedal displacement sensing and the motor rotor sensing are performed by the integrated sensor module 130 in the method of the disclosed technology, it is possible to realize a fast response speed and reduce an influence of surrounding disturbance, compared to existing methods.

In accordance with the disclosed technology, a connection unit for connecting a sensor unit to a main circuit board is connected through a through-hole of a hydraulic block by integrating an existing pedal displacement sensor with an existing motor rotor displacement sensor. Therefore, it is possible to prevent the connection unit from interfering with other parts provided in the vicinity of the hydraulic block, and to perform an assembly work.

In addition, since the connection unit is integrally provided in the sensor unit, it is possible to reduce the number of parts, and thus to reduce assembly processes and costs of products.

While the disclosed technology has been described with respect to the specific embodiments, it will be apparent to those skilled in the art that various changes and modifications may be made.

What is claimed is:

1. An electronic brake system for a vehicle using an integrated sensor, comprising:
   a hydraulic block configured to distribute and supply a fluid to a wheel brake, and having a through-hole disposed on both sides of the hydraulic block to penetrate the hydraulic block;
   a sensor module coupled to the through-hole at one side of the hydraulic block for sensing a linear displacement of a brake pedal and a position of a motor; and
   an electronic control unit coupled to the through-hole on the other side of the hydraulic block opposite to the sensor module, in order to determine a movement distance of the brake pedal, based on the linear displacement of the brake pedal sensed by the sensor module, and control rotation of the motor depending on the linear displacement of the brake pedal.

2. The electronic brake system according to claim 1, wherein the sensor module comprises:
   a sensor housing coupled to the through-hole of the hydraulic block, and having a through-hole penetrated at both sides thereof;
   a circuit board installed at one side of the sensor housing and having a through-hole penetrated at both sides thereof, a sensing-related electric part being mounted on the circuit board;

a pedal sensor module mounted at one side of the circuit board, in order to sense a magnetic field variation depending on movement of the pedal, and transfer information about the sensed magnetic field variation to the electronic control unit; and a motor sensor module mounted at one side of the circuit board, in order to sense an induced current generated by rotation of a rotor, and transfer information about the sensed induced current to the electronic control unit.

3. The electronic brake system according to claim 2, further comprising a connection unit electrically connecting the sensor module to the electronic control unit through the through-hole of the hydraulic block while one end of the connection unit is fixed to the sensor module.

4. The electronic brake system according to claim 3, wherein the pedal sensor module comprises:

an input rod connected to the connection unit so as to be moved depending on movement of the pedal;

a magnet provided at one end of the input rod so as to be moved depending on movement of the input rod; and a sensor unit configured to sense a magnetic field variation depending on movement of a magnetic substance, and transfer the sensed magnetic field variation to the electronic control unit.

5. The electronic brake system according to claim 4, wherein:

the sensor unit is installed at one side of the circuit board; and the magnet is disposed above the sensor unit so as to be spaced apart from the sensor unit.

6. The electronic brake system according to claim 4, wherein the sensor unit is one of a Hall device, a reed switch, an AMR (Anisotropic Magneto-Resistive) sensor, and a GMR (Giant Magneto-Resistive) sensor.

7. The electronic brake system according to claim 4, wherein:

the sensor unit responds to a magnetic field having a directional component in an x-z plane or a y-z plane perpendicular to the circuit board to sense a variation of the magnetic field; and the electronic control unit generates an x-z angle signal or a y-z angle signal indicative of an angle of the directional component of the magnetic field from information about the variation of the magnetic field.

8. The electronic brake system according to claim 2, wherein the motor sensor module comprises:

a coil in which an induced current is generated by movement of the motor rotor; and a current sensor configured to sense the induced current in the coil and transfer a value of the sensed induced current to the electronic control unit.

9. The electronic brake system according to claim 8, wherein the coil comprises:

a first coil in which a magnetic flux is formed by electric energy generated by rotation of the motor; and a second coil configured of a pair of coils connected to each other while an induced current is generated according to the magnetic flux in the first coil.

10. The electronic brake system according to claim 9, wherein the electronic control unit determines an rpm of the motor, based on a rotation angle displacement of the motor.

11. A method of operating an electronic brake system for a vehicle, including a hydraulic block configured to distribute and supply a fluid to a wheel brake, and having a through-hole disposed on both sides of the hydraulic block to penetrate the hydraulic block, a circuit board coupled to the through-hole at one side of the hydraulic block and including a pedal sensor module for sensing a linear displacement of a pedal and a motor sensor module for sensing a rotation angle displacement of a motor, and an electronic control unit coupled to the through-hole on the other side of the hydraulic block opposite to the sensor module, the method comprising:

sensing a variation of a magnetic field generated by a magnet moved along with movement of an input rod;

determining a movement distance of the pedal, based on an intensity and a direction of the magnetic field;

sensing a position of the motor; and controlling rotation of the motor corresponding to the movement distance of the pedal.

12. The method according to claim 11, further comprising determining a rotation displacement of the motor, based on the rotation of the motor.

13. The method according to claim 12, further comprising:

responding to a magnetic field having a directional component in an x-z plane or a y-z plane perpendicular to the circuit board to sense a variation of the magnetic field; and generating an x-z angle signal or a y-z angle signal indicative of an angle of the directional component of the magnetic field from information about the variation of the magnetic field.

14. The method according to claim 11, wherein:

in the sensing a position of the motor, the position of the motor is sensed through an induced current generated in a coil by movement of a motor rotor; and the coil comprises a first coil in which a magnetic flux is formed by electric energy generated by the rotation of the motor, and a second coil configured of a pair of coils connected to each other while an induced current is generated according to the magnetic flux in the first coil.

* * * * *